(12) United States Patent
Fujimori et al.

(10) Patent No.: US 7,295,360 B2
(45) Date of Patent: Nov. 13, 2007

(54) STRUCTURE HAVING LIGHT MODULATING FILM AND LIGHT CONTROL DEVICE USING THE SAME

(75) Inventors: Yoshikazu Fujimori, Kyoto (JP); Takashi Nakamura, Kyoto (JP)

(73) Assignee: Rohm Co., Ltd. (JP)

(*) Notice: Subject to any disclaimer, the term of this patent is extended or adjusted under 35 U.S.C. 154(b) by 0 days.

(21) Appl. No.: 11/346,833

(22) Filed: Feb. 3, 2006

(65) Prior Publication Data
US 2006/0138451 A1   Jun. 29, 2006

Related U.S. Application Data

(63) Continuation of application No. PCT/JP2004/011380, filed on Aug. 6, 2004.

(30) Foreign Application Priority Data

Aug. 7, 2003 (JP) .............................. 2003-289411
Sep. 10, 2003 (JP) .............................. 2003-319107

(51) Int. Cl.
*G02F 1/03* (2006.01)

(52) U.S. Cl. ............... 359/245; 359/251; 359/252; 359/254; 359/255; 359/256; 359/263; 359/315; 359/318; 359/320; 359/323; 345/55; 345/84; 345/206; 345/214; 345/98; 345/99; 345/103

(58) Field of Classification Search ............... 359/197, 359/245, 251–252, 254, 255, 256–258, 263, 359/315, 318, 320, 323; 345/55, 84, 206, 345/214, 98, 99, 103
See application file for complete search history.

(56) References Cited

FOREIGN PATENT DOCUMENTS

| JP | 05-257103 | 10/1993 |
|---|---|---|
| JP | 07-146657 | 6/1995 |
| JP | 2001-337303 | * 7/2001 |
| JP | 2001-356309 | 12/2001 |
| JP | 2002-297008 | 10/2002 |

OTHER PUBLICATIONS

Santos et al., "Hot-Pressed Transparent PLZT Ceramics from Low Cost Chemical Processing," Materials Research, vol. 4, No. 4, (Sep. 2001), pp. 291-295.*
A.Z. Simoes et al., "Effects of annealing on the crystallization and roughness of PLZT thin films," Thin Solid Films, vol. 384, (2001), pp. 132-137.*
International Search Report for International Application No. PCT/JP2004/011380 dated Nov. 9, 2004.
International Preliminary Report on Patentability for International Application No. PCT/JP2004/011380 dated May 18, 2006.

(Continued)

*Primary Examiner*—Evelyn A. Lester
(74) *Attorney, Agent, or Firm*—Cantor Colburn LLP (57) ABSTRACT

A structure includes a substrate and a light modulating film formed on top of the substrate. The light modulating film is made of polycrystalline PLZT containing Pb, Zr, Ti, and La as constituent elements. The film has a La concentration in the range of 5 at % to 30 at %. The relative dielectric constant at a frequency of 1 MHz is higher than or equal to 1200.

12 Claims, 8 Drawing Sheets

OTHER PUBLICATIONS

European Search Report for Application No. 04771379.7-2205 dated Jul. 27, 2006.

Hong-Jin Zhao, et al.; "Preparation and properties of PLZT thick films on silicon"; Materials Science and Engineering B99 (2003) 195-198.

M. Es-Souni, et al.; "Microstructure and properties of sol-gel processed . . . thin films. The effects of lanthanum content and bottom electrodes"; Thin Solid Films 389 (2001) 99-107.

European Search Report for Application No. 04 771 379.7-2205 mailed Nov. 20, 2006.

Zhao H-J et al. "Preparation and properties of PLZT thick film on silicon", Materials Science and Engineering B, Elsevier Sequoia, Lausanne, Ch, vol. 99, No. 1-3, May 25, 2003, pp. 195-198, XP004433341.

Es-Souni M et al. "Microstructure and properties of sol-gel processed $Pb_{1-x}La_x(Zr_{0.52}, Ti_{0.48})_{1-x/4}O_3$ thin films. The effects of lanthanum content and bottom electrodes", Thin Solid Films, Elsevier-Sequoia S.A. Lausanne, Ch, vol. 389, No. 1-2, Jun. 15, 2001, pp. 99-107, XP004242317.

* cited by examiner

STRUCTURE HAVING LIGHT MODULATING FILM AND LIGHT CONTROL DEVICE USING THE SAME

CROSS-REFERENCE TO RELATED APPLICATION

The present application is a continuation of PCT/JP2004/011380, filed on Aug. 6, 2004, the entire contents of which are incorporated herein by reference, and which claims the benefit of the date of the earlier filed Japanese Patent Applications No. JP 2003-289411 filed on Aug. 7, 2003 and No. JP 2003-319107 filed on Sep. 10, 2003.

BACKGROUND OF THE INVENTION

1. Field of the Invention

The invention relates to a structure having a light modulating film, and a light control device using the same.

2. Description of the Related Art

PLZT is a transparent ceramic having a composition of $(Pb_{1-y}La_y)(Zr_{1-x}Ti_x)O_3$, and is known as a material having an electrooptic effect. The electrooptic effect refers to the phenomenon that a substance causes polarization with a change in its refractive index when an electric field is applied to the substance. Through the use of the electrooptic effect, it is possible to switch light phase by turning on/off the applied voltage. PLZT thus has such applications as a light control device such as an optical shutter.

For these applications including the optical shutter device, bulk PLZT has been widely used conventionally (Japanese Patent Laid-Open Publication No. Hei 5-257103). It is difficult, however, for optical shutters using bulk PLZT to meet demands for finer configuration, higher integration, lower operating voltage, and lower cost. Besides, the bulk method includes the step of processing a mixture of metal oxides, or materials, at high temperatures of 1000° C. and above. If this method is applied to the device formation processes, a number of constraints will thus be imposed on the selection of the materials, the device structures, and so on.

Under the circumstances, attempts have been made to apply a thin film of PLZT formed on a base member to the light control device, instead of bulk PLZT. A display unit using such a PLZT thin film appears in Japanese Patent Laid-Open Publication No. Hei 7-146657 (paragraphs 0022 to 0044). The publication describes that a PLZT film is formed on a glass or other transparent substrate, comb-shaped electrodes are formed thereon, and the resulting structure is used as an optical shutter that utilizes a quadratic electrooptic effect of PLZT. While this optical shutter realizes a low-voltage-driven display unit having simple configuration and high reliability, it still has room for improvement in terms of the magnitude and stability of the quadratic electrooptic effect.

Meanwhile, as a recording method of large capacity, digital information recording systems using the principle of holography have been receiving attention recently (for example, see Japanese Patent Laid-Open Publication No. 2002-297008). Unprecedented excellent systems can be expected if PLZT-based optical shutters are applied to these systems. This requires, however, an even higher level of performance in terms of the magnitude and stability of the quadratic electrooptic effect. More specifically, the technical challenge of importance is to achieve a PLZT thin film that makes and can stably exhibit a sufficiently large change in the refractive index with respect to predetermined light.

By the way, it has been unfeasible in the conventional level of technology to fabricate a PLZT thin film that shows a high quadratic electrooptic effect with stability. Some device structures require that PLZT be formed on a polycrystalline or amorphous underlayer. In such locations, it is even harder to realize a PLZT thin film that shows a high quadratic electrooptic effect with stability.

SUMMARY OF THE INVENTION

The present invention has been achieved in view of the foregoing circumstances. Thus at least an embodiment of the present invention may provide a structure in which PLZT showing a high quadratic electrooptic effect with stability is formed on a substrate, and a light control device using the same.

A first structure according to at least an embodiment of the present invention is a structure comprising a substrate and a light modulating film formed on top of the substrate, wherein the light modulating film has a relative dielectric constant of 1200 or higher at a frequency of 1 MHz. This light modulating film may be made of polycrystalline PLZT containing Pb, Zr, Ti, and La as constituent elements, and may have a La concentration in a range of 5 at %(atomic percentage) to 30 at %.

A second structure according to at least an embodiment of the present invention is a structure comprising a substrate and a light modulating film formed on top of the substrate, wherein: the light modulating film is made of polycrystalline PLZT containing Pb, Zr, Ti, and La as constituent elements; a La concentration in the film falls within a range of 5 at % to 30 at %; and grains constituting the polycrystalline PLZT have an average grain size of 800 nm or greater.

A third structure according to at least an embodiment of the present invention is a structure comprising a substrate and a light modulating film formed on top of the substrate, wherein: the light modulating film is made of polycrystalline PLZT containing Pb, Zr, Ti, and La as constituent elements; a La concentration in the film falls within a range of 5 at % to 30 at %; and a value of $I(111)/I(110)$ is higher than or equal to 1, where $I(110)$ is X-ray diffraction intensity on the (110) plane of the polycrystalline PLZT, and $I(111)$ is X-ray diffraction intensity on the (111) plane.

A light control device according to at lea&an embodiment of the present invention comprises any one of the first to third structures. Here, a pair of electrodes are formed on the light modulating film so that the light modulating film varies in refractive index in accordance with an electric field applied between the pair of electrodes.

PLZT is a ferroelectric, and changes in polarity at a rate proportional to the exponential of the electric field. This makes it possible to switch on/off light at higher speed. The amount of increase of the electric field necessary for switching on/off the light can also be made smaller. Since PLZT crystals have low anisotropy, differences between the switching speeds of respective crystal grains are small. This can reduce deviations in speed at the time of switching.

Moreover, PLZT employed in the structures of the present invention has a high La composition. It thus shows a stable high quadratic electrooptic effect, and offers excellent performance as a light modulating film.

Figure 8:
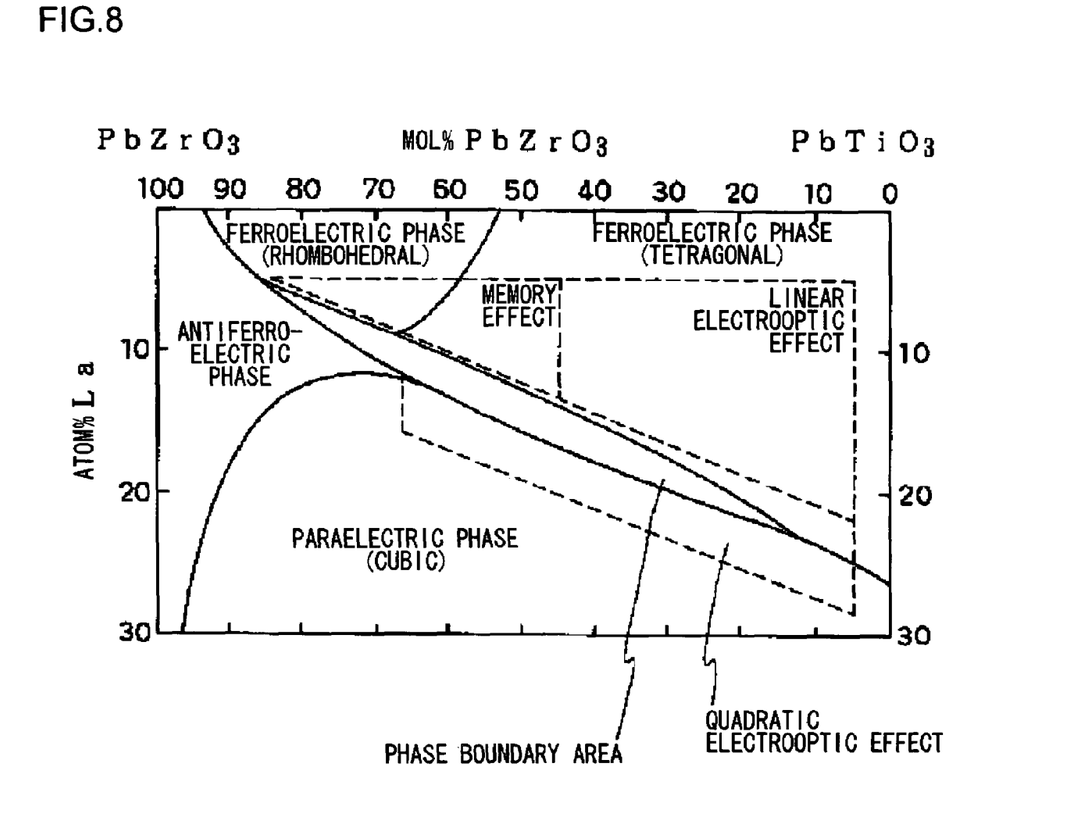
FIG. 8 is a phase diagram of PLZT.

FIG. 8 is a phase diagram showing the relationship between the composition and the film characteristic of PLZT. In FIG. 8, the ordinate represents the percentage of the number of La atoms with respect to the sum of the numbers of Zr atoms and Ti atoms. As shown in FIG. 8, the quadratic electrooptic effect occurs from compositions of relatively high La concentrations. Then, the inventor attempted to form PLZT films from materials of high La compositions by a sol-gel method, but the resultant films showed low relative dielectric constants and small Kerr constants.

The reason for this is not exactly known, whereas it seems to be ascribable to how La exists in PLZT. More specifically, in PLZT formed by the foregoing process, La segregates on the grain boundaries of the polycrystalline PLZT, not being taken into the grains. In other words, since PZT and La oxides are separate from each other in the film, which seems to cause a drop in the relative dielectric constant. Provided that PZT and La oxides segregate from each other to create individual domains, the relative dielectric constant of the film is expected to approach the areal average of the relative dielectric constants of the respective materials. Here, La oxide films have a relative dielectric constant of the order of 30, a value much smaller than that of PZT (1000 or higher). Such a form, when taken, can thus lower the relative dielectric constant of the entire film significantly.

Consequently, the inventor has conducted further research on how to fabricate a film having a high La composition and a high relative dielectric constant. As a result, the inventor has found that some conditions in the manufacturing processes of sol-gel method can be adjusted to obtain films having higher relative dielectric constants.

Specifically, for example, it has become clear that PLZT films having greater grain sizes can be obtained by performing the heat treatment for grain growth at higher temperatures or for a longer time. The greater the grain sizes, the smaller the surface areas of the grain boundaries become and thus the more reliably La precipitation can be suppressed.

Besides, in the process of cooling after the heat treatment for grain growth, the cooling rate can be increased to suppress a drop in the relative dielectric constant ascribable to La precipitation. Through the introduction of such a method, it is possible to manufacture a high dielectric constant film that exhibits an excellent quadratic electrooptic effect with stability.

In the foregoing first structure, the light modulating film has a high relative dielectric constant of 1200 or above at a frequency of 1 MHz. This value of the relative dielectric constant can be obtained, for example, by making the light modulating film out of polycrystalline PLZT, having a lanthanum composition with a high La concentration in the range of 5 at % to 30 at %.

As mentioned previously, the relative dielectric constant provides an indication of whether or not La is taken into grains. Such a high relative dielectric constant is achieved by the form that a considerable amount of La is taken in PLZT grains.

This structure, as described above, can be fabricated by increasing the cooling rate in the process of cooling after the heat treatment for grain growth. Due to the use of PLZT having a high relative dielectric constant as described above, this structure can be increased in the rate of change in polarization upon the application of the electric field. It can thus be used suitably for a device that exhibits a high electrooptic effect.

Incidentally, as employed in the present embodiment, the La concentration in the range of 5 at % to 30 at % shall refer to that the percentage of the number of La atoms with respect to the sum of the numbers of Zr and Ti atoms falls within the range of 5% to 30%.

Now, in the second structure, the grains constituting the polycrystalline PLZT have an average-grain size of 800 nm or greater. This makes La easier to be taken into the PLZT grains, whereby a high quadratic electrooptic effect is exerted with stability. Moreover, the large particle sizes of the grains lower the density of the grain boundaries, thereby suppressing dispersion of incident light. Consequently, when the structure is applied to a light control device that utilizes the quadratic electrooptic effect, it is possible to provide an excellent device of high efficiency.

In the third structure, the value of $I(111)/I(110)$ is higher than or equal to 1, where $I(110)$ is the X-ray diffraction intensity on the (110) plane of the polycrystalline PLZT, and $I(111)$ is the X-ray diffraction intensity on the (111) plane. That is, in this structure, the crystal grains of PLZT are oriented in the (111) direction preferentially.

When PLZT crystal grains are attempted to be oriented in the (100) direction preferentially, light dispersion increases if there are (001)-oriented crystals beside the (100)-oriented crystals. In contrast, the preferential orientation in the (111) direction can reduce deviations in the directions of crystal orientation. It is therefore possible to suppress light dispersion at grain boundaries, thereby enhancing the electrooptic effect. Incidentally, dominant crystal structures in the PLZT films according to at least an embodiment of the present invention are cubic and tetragonal. The arrangement of these crystal grains inside the films can thus be optimized to exert the quadratic electrooptic effect with stability.

In at least an embodiment of the present invention, a peak half width of the X-ray diffraction on the (111) plane is smaller than or equal to 5°. This allows higher film crystallinity. It is therefore possible to increase the electrooptic effect.

In the structures which may be used in at least an embodiment of the present invention, the substrate may be a silicon substrate. For example, the substrate may be composed of a silicon substrate and an insulating film formed thereon. As mentioned previously, it has been heretofore technically difficult to form a PLZT film on an amorphous substrate. According to at least an embodiment of the present invention, however, it may be possible to form a film of PLZT on an amorphous substrate. This inn makes it possible to integrate various devices including drivers onto the silicon substrate. Consequently, in a display device or the like coupled with memories, it may be possible to maintain a full screen effectively.

The entire device can also be configured finer as the integration on the silicon substrate is possible. The finer configuration can reduce the distance between electrodes. This makes it possible to lower the voltage that is necessary for creating a predetermined electric field. The operating voltage is thus lowered. The reliability can thus be improved. This also allows speedup and cost reduction.

In the structures of the present invention, a reflecting film may be formed on the insulating film, and the light modulating film may be formed on this reflecting film. Light incident on the light modulating film can thus be reflected on the reflecting film and introduced into the light modulating film again. As a result, the transmission of the reflected light can be switched on/off depending on the voltage applied to the light modulating film. This allows suitable application to a light control device of reflection type. The reflecting film may also contain Pt or Ir, for example. This makes it possible to reflect the light incident on the light modulating film with even higher reliability.

In the structures of the present invention, the light modulating film may be one formed by a sol-gel method. This makes it possible to form the PLZT film having a high quadratic electrooptic effect with reliability. The PLZT film can also be reduced in thickness. It is therefore possible to lower the voltage required.

In the structures of the present invention, the light modulating film may have a refractive index of 2.8 or higher at a wavelength of 633 nm. This can suitably increase the Kerr constant R in value, yielding a high quadratic electrooptic effect.

Furthermore, a method of manufacturing a light modulating film according to at least an embodiment of the present invention comprises applying a liquid containing Pb, Zr, Ti, and La onto a surface of a substrate and drying the same to form a film before heating the film for crystallization and then cooling it at a rate higher than 1200° C./min.

This manufacturing method includes the rapid cooling after the heat treatment. Such cooling can suppress a drop in the relative dielectric constant ascribable to the precipitation of La. A high dielectric constant film having an excellent quadratic electrooptic effect can thus be manufactured with stability.

Up to this point, the configuration of the present invention has been described. Any combinations of the foregoing components, and expressions of the present invention converted into other categories are also intended to constitute applicable aspects of the present invention. For example, a variety of devices having the foregoing PLZT films also constitute applicable aspects of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

In the following embodiments, a La composition, unless otherwise specified, shall refer to the percentage of the number of La atoms with respect to the sum of the numbers of Zr and Ti atoms.

FIRST EMBODIMENT

In the present embodiment, a PLZT film is formed on a silicon substrate by using a sol-gel method. Initially, a mixed solution containing metal alkoxides of Pb, La, Zr, and Ti is spin-coated onto one of the surfaces of the silicon substrate. Examples of the starting materials, or metal alkoxides, available include $Pb(CH_2COO)_2.3H_2O$, $La\ (O\text{-}i\text{-}C_3H_7)_3$, $Zr(O\text{-}t\text{-}C_4H_9)_4$, and $Ti(O\text{-}i\text{-}C_3H_7)_4$. The mixed solution shall have an atomic composition from which the quadratic electrooptic effect is obtained in the phase diagram of FIG. 8. For example, in the present embodiment, Pb:La:Zr:Ti=105:9:65: 35. The thickness of the mixed solution is around 100 nm to 5 μm, for example.

After the spin-coating, drying is performed at a predetermined temperature, followed by pre-firing in a dry air atmosphere. For example, the drying temperature is between 100° C. and 250° C. Here, the temperature shall be 200° C. The pre-firing can be performed at or above 300° C., and preferably at or above 400° C. This can remove organics, moisture, and residual carbon with reliability. The duration of the pre-firing is 1 minute to 1 hour or so, for example. Before the pre-firing, the application and drying of the solution may be repeated until the predetermined thickness is reached.

Subsequently, heat treatment is applied in an $O_2$ atmosphere so that PLZT is crystallized for grain growth. For example, the heat treatment temperature is between 600° C. and 750° C. This range of temperatures can crystallize PLZT reliably. The heat treatment temperature is preferably at or above 700° C. This can increase the average grain size of the crystals. The specific surface areas of the grains can thus be reduced for suppression of La precipitation. The duration of the heat treatment may be 10 seconds to 5 minutes, for example, and preferably 1 minute or longer. This can make the grains even greater.

After the completion of the heat treatment, the crystallized PLZT film is cooled rapidly. This cooling process is typically conducted at a rate of around 400° C./min to 1000° C./min. This makes it difficult, however, to introduce La into the PLZT grains in high concentrations. Specifically, for example, if the material composition reaches or exceeds 7% in the percentage of the number of La atoms with respect to the sum of the numbers of Zr and Ti atoms, it becomes extremely difficult to introduce the same concentration of La into the grains as in the material composition. Then, in the present embodiment, a higher cooling rate is employed in the cooling process after the heat treatment. The cooling rate may be higher than 1200° C./min, such as 1800° C./min, for example.

Through the foregoing steps, a structure having a PLZT thin film formed on a silicon substrate is obtained. This PLZT thin film has a high La composition that falls within the range of 5% and 30% by atom in La concentration. The PLZT obtained by the foregoing steps was measured for relative dielectric constant at a frequency of 1 MHz, and found to be 1200. From this value, it is considered that a sufficient amount of La is taken into the grains of the PLZT obtained in the present embodiment.

SECOND EMBODIMENT

In the present embodiment, a seed layer is formed on a silicon substrate, and a metal alkoxide layer is then spin-coated to form PLZT. The formation of the seed layer makes it possible to obtain a uniform PLZT film having excellent crystallinity. It is also possible to form a PLZT film having greater grain sizes stably.

A mixed solution for forming the seed layer is a liquid containing seed particles, a surface-active agent of around 0.1% to 10% by weight, and an organic solvent. This mixed solution is applied onto the silicon substrate by spin coating or the like, thereby forming the seed layer. Since the formation of such a seed layer promotes favorable crystallization with the seed particles as cores, it becomes possible to obtain a uniform PLZT film having excellent crystallinity.

For example, Ti ultra-fine particles may be used as the seed particles. The Ti ultra-fine particles desirably have particle sizes of around 0.5 nm to 200 nm, and preferably around 1 nm to 50 nm. By the way, in order for ultra-fine particles to make a core, a certain number of atoms are required. Cores are not made of a single atom, and desirably have sizes sufficiently greater than those of the atoms of 0.1 nm or so. If the cores are too large, in contrast, the centers of the Ti cores will remain intact. High annealing temperatures are thus required so as not to leave Ti. In addition, sizes exceeding 200 nm make it possible to form a flat uniform PLZT film. The greater the cores, the harder to disperse into the solvent, too.

The seed particles desirably have a concentration of around 0.00001% (0.1 ppm) to 1% by weight. The Ti ultra-fine particles are coated around with the surface-active agent in the mixed solution.

For the organic solvent, α-terpineol is used suitably. Aside from this, xylene, toluene, 2-methoxyethanol, and butanol may also be used.

When forming the seed layer, the application of the mixed solvent is preferably followed by drying and firing. The drying can be performed, for example, at around 200° C. to 400° C. for about 1 to 10 minutes. This can remove the solvent. The firing may be performed at temperatures for crystallizing the seed layer. In general, heating at around 450° C. to 750° C. for about 1 to 10 minutes will suffice.

According to the embodiment described above, it is possible to form a film having the following properties with stability.

La composition: between 5 at % and 30 at %;

Relative dielectric constant (at a frequency of 1 MHz): 1200 and above;

Average grain size of PLZT: 800 nm and above;

X-ray diffraction characteristic of PLZT: $I(111)/I(110)$ not lower than 1

(where $I(110)$ is the X-ray diffraction intensity on the (110) plane of PLZT, and $I(111)$ is the X-ray diffraction intensity on the (111) plane); and Peak half width of the X-ray diffraction on the (111) plane of PLZT: 5° and below.

Films having these properties are high in Kerr constant and show an excellent quadratic electrooptic effect. These films can thus be suitably used for light control devices such as in light modulators of holographic memories, display devices, optical communication switches, optical arithmetic units, and cryptographic circuits.

For example, in order for the light modulators of holographic memories to operate at frame rates of 10 kHz and above, the light modulating films must be reduced to or below 100 μs in switching speed. Conventional liquid crystals have response speeds of around 100 μs to 1 ms, and MEMS (Micro-Electro-Mechanical Systems) several tens of microseconds or so. It has thus been difficult to achieve high-speed switching corresponding to the foregoing frame rates. According to the light modulating film of the present invention, in contrast, responds speeds of the order of nanoseconds are achieved by the optical switching. It is therefore possible to realize high-performance holographic memories.

THIRD EMBODIMENT

Figure 1:
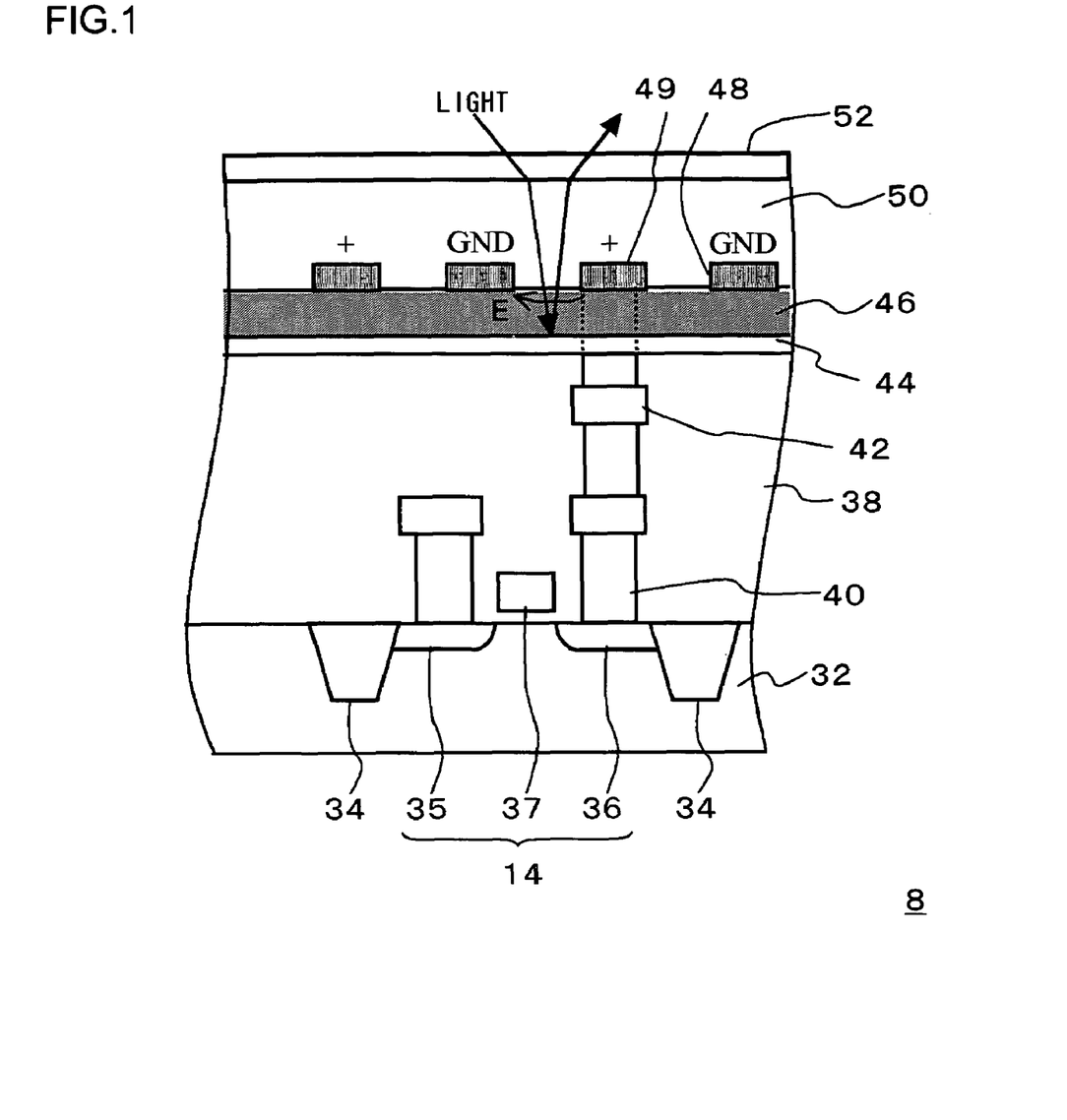
FIG. 1 is a partial sectional view showing the configuration of a light control device according to an embodiment.

FIG. 1 is a partial sectional view showing the configuration of a light control unit 8 according to the third embodiment. The light control unit 8 includes: a substrate 32; an insulating film 38 formed on the substrate 32; a reflecting film 44 formed on the insulating film 38; a light modulating film 46 formed on the reflecting film 44; a first electrode 48 and a second electrode 49 arranged on the light modulating film 46; and a protection film 50 formed to cover the first and second electrodes 48 and 49. In addition, a polarizing plate 52 is placed on the protection film 50. While in this configuration the first electrode 48 and the second electrodes 49 are arranged on the light modulating film 46, the first and second electrodes 48 and 49 may be formed on the reflecting film 44, so that the light modulating film 46 is formed thereon.

The light modulating film 46 is a PLZT film that is formed by a sol-gel method. The film has a thickness of the order of 1 μm. PLZT shall satisfy the following conditions.

La composition: between 5 at % and 30 at %;

Relative dielectric constant (at a frequency of 1 MHz): 1200 and above;

Average grain size of PLZT: 800 nm and above;

X-ray diffraction characteristic of PLZT: $I(111)/I(110)$ not lower than 1

(where $I(110)$ is the X-ray diffraction intensity on the (110) plane of PLZT, and $I(111)$ is the X-ray diffraction intensity on the (111) plane); and Peak half width of the X-ray diffraction on the (111) plane of PLZT: 5° and below.

In the present embodiment, a monocrystalline silicon substrate is used as the substrate 32. The substrate 32 is provided with element isolation regions 34, a drain (or source) 35, and a source (or drain) 36. The insulating film 38 is provided with a gate 37, thereby constituting a transistor 14. The insulating film 38 is made of a silicon oxide film, for example. The insulating film 38 is also provided with plugs 40 and wiring 42 which are formed in connection with the source 36. The wiring 42 is made of aluminum or copper, for example. The plugs 40 are made of tungsten or copper, for example.

The reflecting film 44 (of approximately 100 nm in thickness) is a film for reflecting incident light, and may be made of Pt, for example.

The first electrode 48 and the second electrode 49 (each having a thickness of approximately 150 nm) may be made of Pt or ITO (Indium Tin Oxide), for example. When formed on the light modulating film 46, these first and second electrodes 48 and 49 are preferably made of a transparent material such as ITO. This can increase the display areas of respective pixels. The protection film 50 (of approximately several micrometers in thickness) may be made of SiN or alumina, for example.

Figure 2:
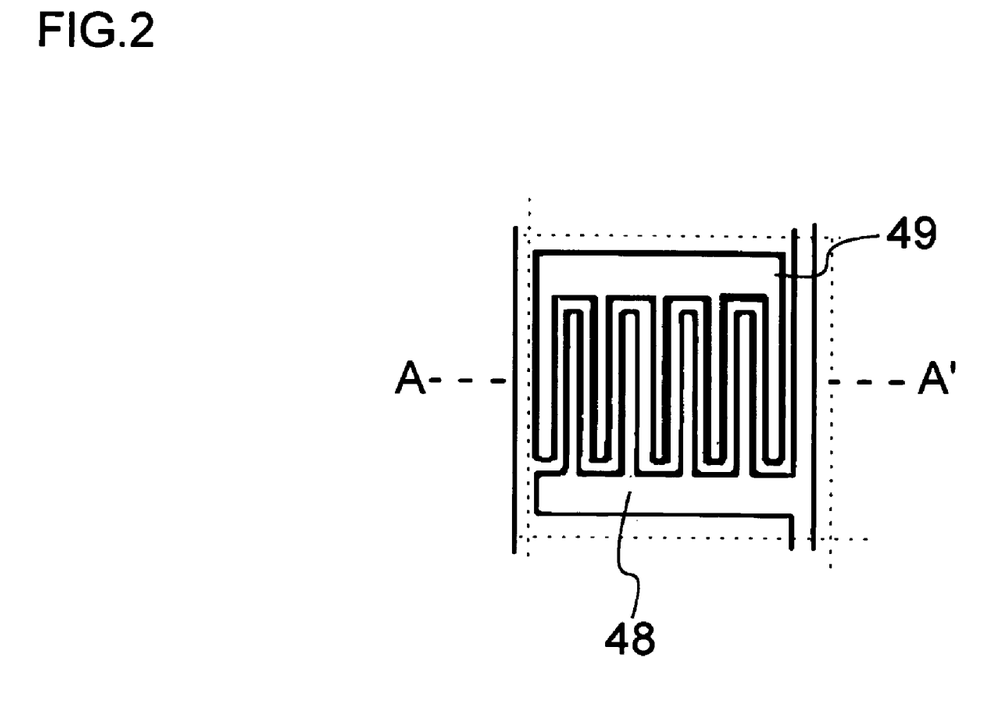
FIG. 2 is a top view showing the configuration of a first electrode and a second electrode.

FIG. 2 is a top view showing the configuration of the first electrode 48 and the second electrode 49. The first electrode 48 and the second electrode 49 both are formed in a comb shape, and arranged so that their teeth are interposed between the teeth of the other. In the present embodiment, each pixel is composed of a pair of comb-shaped first and second electrodes 48 and 49. Here, the first electrode 48 and the second electrode 49 may be spaced by 0.5 to 1.5 μm, for example. When the spacing between the first and second electrodes 48 and 49 falls within this range, it is possible to lower the voltage between the first and second electrodes 48 and 49 while controlling the refractive index of the light modulating film 46 with high precision. FIG. 1 corresponds to the cross section taken along the line A-A' of FIG. 2.

Returning to FIG. 1, the first electrode 48 is grounded while brightness data is applied to the second electrode 49. In the area constituting a single pixel of the light modulating film 46, the refractive index of the light modulating film 46 varies in accordance with the voltage applied to the second electrode 49. In this state, if the light control unit 8 is irradiated with light from above the polarizing plate 52, the irradiating light is passed through the polarizing plate 52 and incident on the light modulating film 46 through the protection film 50. Here, the light incident on the light modulating film 46 is refracted to a different angle in accordance with the refractive index of the light modulating film 46 in that area. The light incident on the light modulating film 46 is reflected by the reflecting film 44, passed through the light modulating film 46 and the protection film 50, and emitted from the polarizing plate 52. Here, the light to be emitted from the polarizing plate 52 varies in transmittance depending on the refractive index of the light modulating film 46, whereby the brightness data of each frame can be displayed on the polarizing plate 52.

FOURTH EMBODIMENT

Figure 7:
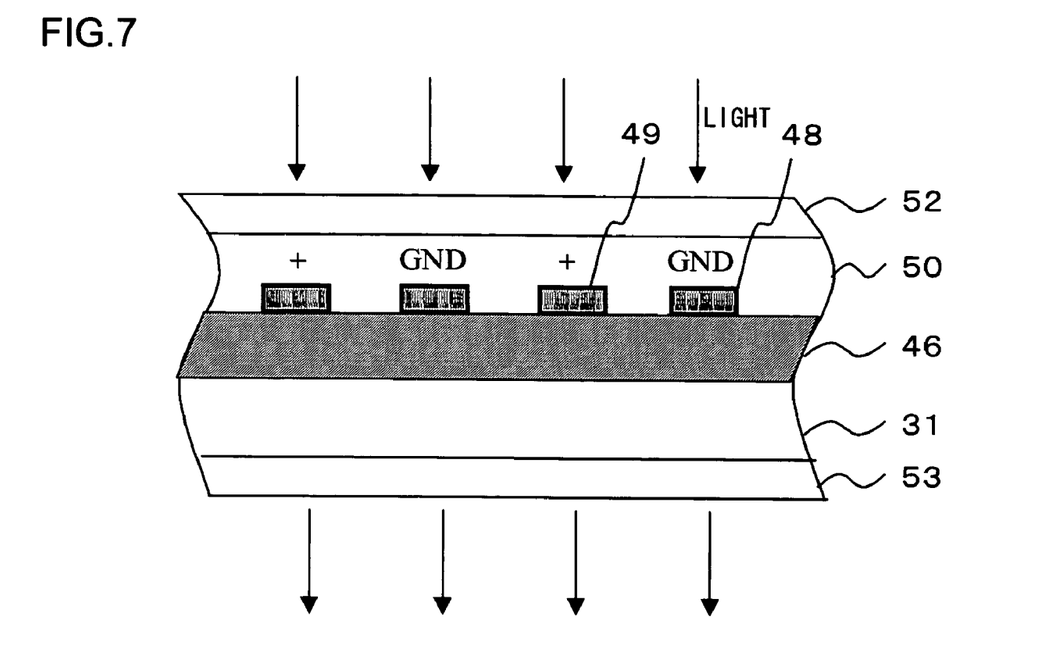
FIG. 7 is a partial sectional view showing the configuration of a light control device according to another embodiment.

FIG. 7 is a partial sectional view of a light control unit 8 of transmission type. In the case of the transmission type, the light control unit 8 preferably uses a glass or other transparent substrate 31. The first electrode 48 and the second electrodes 49 are also preferably made of ITO or other transparent electrodes. Moreover, aside from the polarizing plate 52, another polarizing plate 53 is formed on a side of the substrate 31 opposite from the side where the light modulating film 46 is formed. Consequently, light incident on the light modulating film 46 from the side of the polarizing plate 52 is transmitted with modulation, and switched on/off when passing the polarizing plate 53. As a result, signal light including a desired pattern can be obtained in accordance with the voltage applied to the light modulating film 46.

Up to this point, the present invention has been described in conjunction with the embodiments thereof. It will be understood by those skilled in the art that these embodiments are given by way of illustration only, various modifications may be made thereto, and all such modifications are also intended to fall within the scope of the present invention.

For example, in the light control unit 8 of the third or fourth embodiment, the first and second electrodes 48 and 49 may be made of $IrO_2$. This can suppress oxygen vacancies in PLZT, thereby improving the reliability of the light control unit 8. $IrO_2$ may also be used instead of ITO and the like, since it provides light transparency at small thicknesses of, e.g., 50 nm or so.

The configuration of these electrodes is not limited to the comb shape, neither. For example, in the light control device of reflection type described in the third embodiment, the first and second electrodes 48 and 49 may be replaced with a single plate electrode so that an electric field is formed between the plate electrode and the reflection film 44.

PRACTICAL EXAMPLES (Fabrication of PLZT Film)

Silicon oxide films were formed on silicon substrates, and Pt films were sputtered on the silicon oxide films. Then, PLZT was formed over the Pt films by the sol-gel method. The Pt films were 150 nm in thickness.

The ratio of metal atoms in the mixed solution for forming PLZT was Pb:La:Zr:Ti=105:9:65:35. The mixed solution was initially applied onto the Pt films by spin coating. The resultant were heated at 150° C. for 30 minutes for prebaking, and then at 450° C. for 60 minutes for pre-firing. This series of steps was repeated four times before final firing was performed in an oxygen atmosphere at 700° C. for one minute. After the firing, the PLZT films were cooled at the respective cooling rates shown in FIG. 1, thereby obtain the PLZT film samples.

(Evaluations)

The samples 1 to 3 in Table 1 were individually measured for the refractive index n, the relative dielectric constant $\in$, the Kerr constant R, and the grain diameter D. The samples 1 and 3 were also measured for X-ray diffraction spectra.

Incidentally, the refractive indexes of the samples were calculated from their absorbances to light having a wavelength of 633 nm. The relative dielectric constants of the samples were measured in an AC electric field of 1 MHz in frequency. The average diameters of the grains in the films were observed under a scanning electron microscope (SEM). The X-ray diffraction measurement was conducted on the condition of $\theta/2\theta$ scanning, with X-rays having a wavelength of $CuK\alpha$: 1.5418 Å.

(Measurements)

Figure 3:
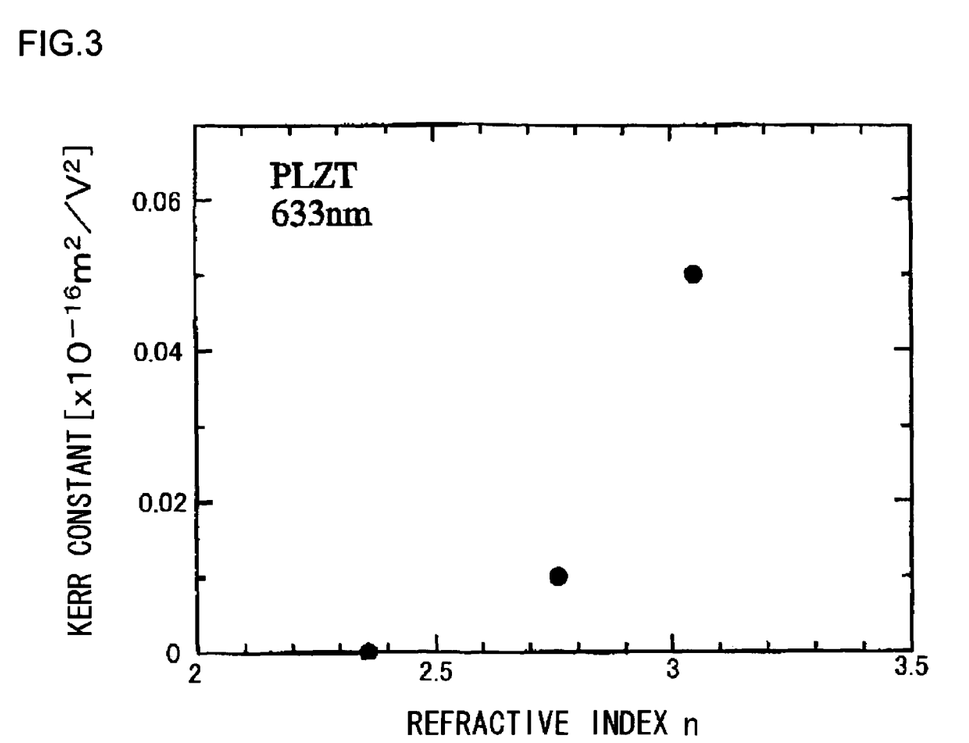
FIG. 3 is a chart showing the relationship between the refractive index and Kerr constant of PLZT films according to practical examples.
Figure 4:
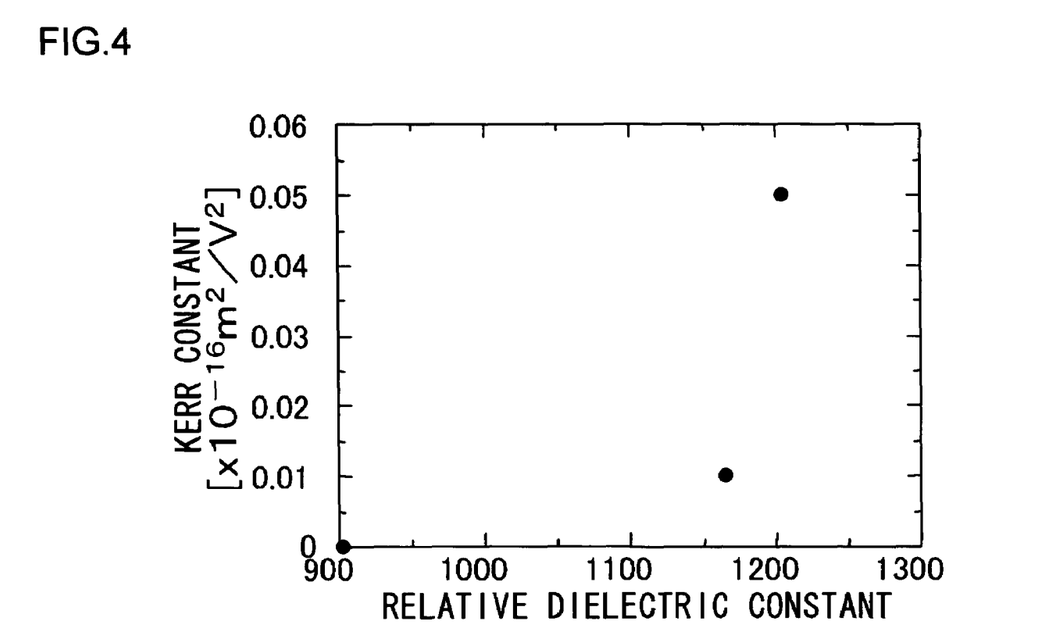
FIG. 4 is a chart showing the relationship between the relative dielectric constant and Kerr constant of the PLZT films according to the practical examples.
Figure 5:
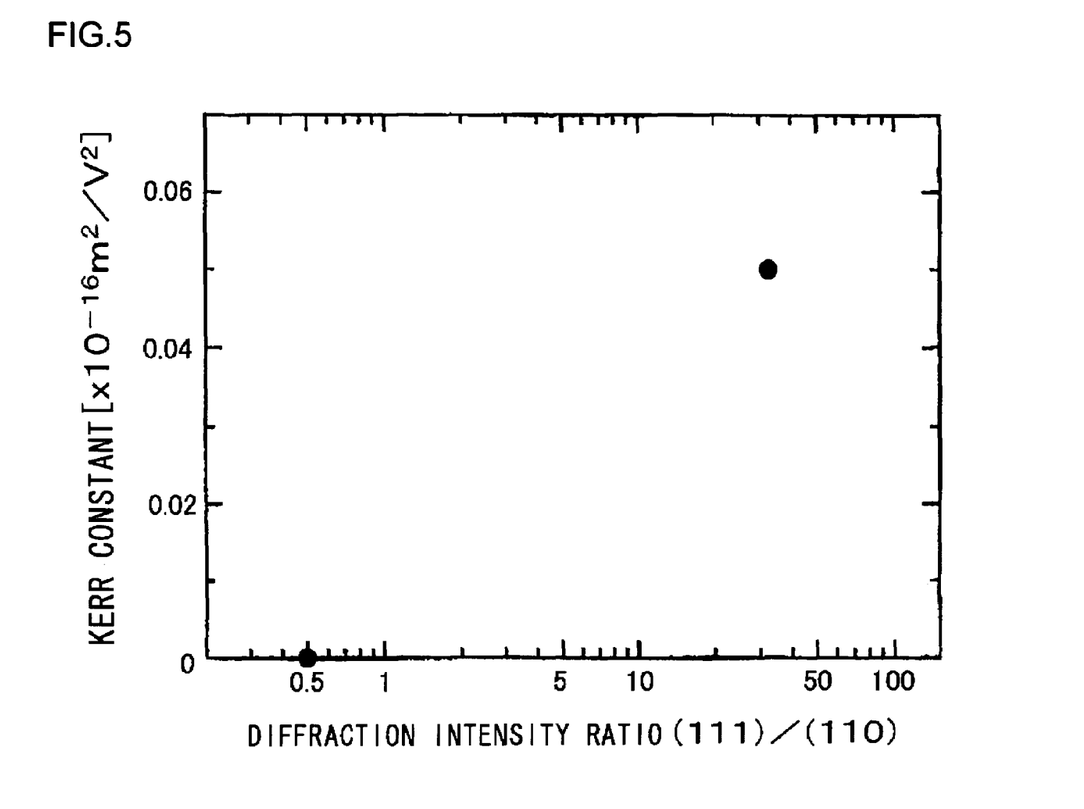
FIG. 5 is a chart showing the relationship between the X-ray diffraction peak intensity ratio and Kerr constant of the PLZT films according to the practical examples.
Figure 6:
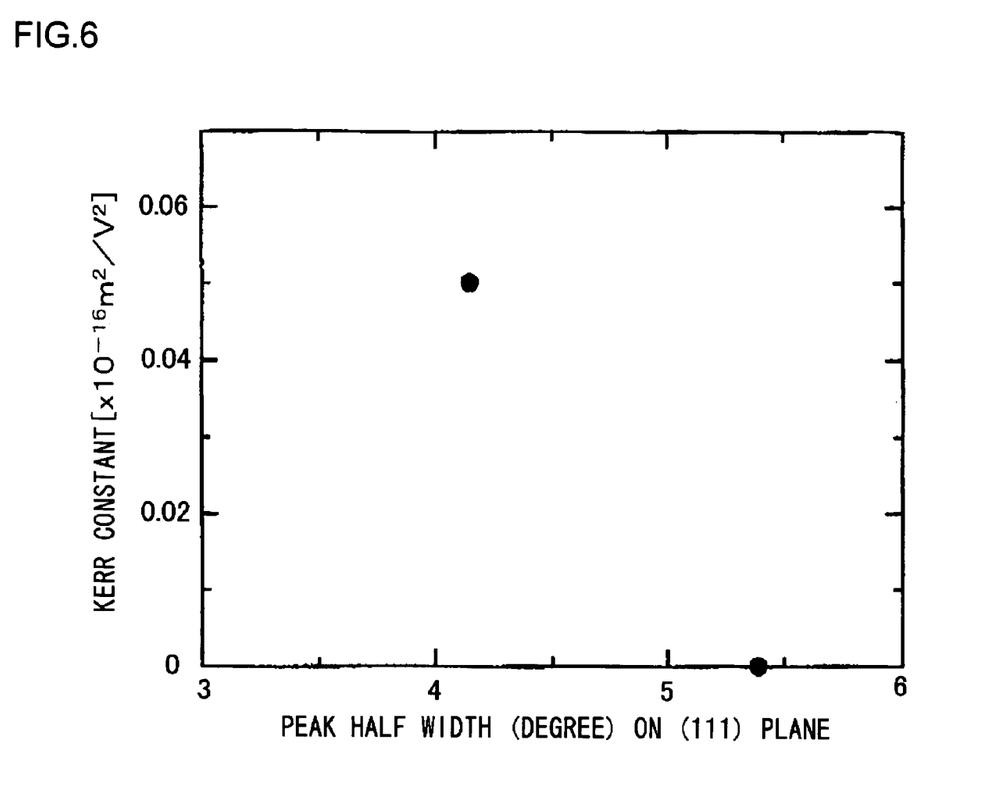
FIG. 6 is a chart showing the relationship between the X-ray diffraction peak half widths and Kerr constants of the PLZT films according to the practical examples.

Table 1 shows the measurements on the physical properties of the samples. FIG. 3 shows the relationship between the refractive index n and the Kerr constant R of the samples. FIG. 4 shows the relationship between the relative dielectric constant $\in$ and Kerr constant R of the samples. FIG. 5 shows the ratios between the peak intensities on the (111) plane (peak $2\theta$=approximately 38°) and the (110) plane (peak $2\theta$=approximately 31°) in the X-ray diffraction spectra of the samples, being plotted in relation to the Kerr constant R. FIG. 6 shows the relationship between the half width on the (111) plane (peak $2\theta$=approximately 38°) in the X-ray diffraction spectra and the Kerr constant.

From FIGS. 3 and 4 and Table 1, it can be seen that high Kerr constants are obtainable from PLZT films having refractive indexes of 2.8 and above, or relative dielectric constants of 1200 and above. It is also shown that an average grain diameter of approximately 1 μm provides a high Kerr constant.

These measurements suggest that in the sample 3, La inside the crystal is taken into the grains because of the rapid cooling after the firing. In addition, since the specific surface area increases with increasing average gain size, it seems possible to suppress the precipitation of La oxides (such as $La_2O_3$).

Meanwhile, in the sample 1, it can be seen that an additive rule holds for the refractive indexes in the PZT phase and the La phase (La-oxide phase). This suggests that the small cooling rate precipitates La oxides, so that both the PZT phase and the La phase are formed inside the film.

Now, what can be seen from the results of FIGS. 5 and 6 are as follows. Incidentally, the PLZT films seem to contain both cubic and tetragonal grains.

The results of FIG. 5 show that the orientation of the entire film toward the (111) plane can be increased to improve the quadratic electrooptic effect. The reason seems that the increased orientation toward the (111) plane can reduce deviations in orientation between crystal grains. In addition, it is evident from FIG. 6 that the peak half width on the (111) plane can also be reduced to improve the quadratic electrooptic effect. The reason seems to be that the reduced peak half width improves the crystallinity of the entire film.

TABLE 1

| SAMPLE No. | COOLING RATE (° C. min$^{-1}$) | REFRACTIVE INDEX n | RELATIVE DIELECTRIC CONSTANT ε (×10$^3$) | KERR CONSTANT (×10$^{-16}$ m$^2$V$^{-2}$) | GRAIN SIZE (nm) | X-RAY DIFFRACTION INTENSITY RATIO I(111)/I(110) | X-RAY DIFFRACTION PEAK HALF WIDTH (DEGREES) | ESTIMATED STRUCTURE |
|---|---|---|---|---|---|---|---|---|
| 1 | 400 | 2.46 | 0.90 | 0.00 | 200 | 0.5 | 5.4 | PZT + La |
| 2 | 1200 | 2.76 | 1.16 | 0.01 | 200 | — | — | PZT + La |
| 3 | 1800 | 3.05 | 1.20 | 0.05 | 1000 | 30 | 4.1 | PLZT |

The present invention is applicable to light control devices such as an optical shutter.

While the preferred embodiments of the present invention have been described using specific terms, such description is for illustrative purposes only, and it is to be understood that changes and variations may be made without departing from the spirit or scope of the appended claims. The presently disclosed embodiments are therefore to be considered in all respects as illustrative and not restrictive, and all changes which come within the meaning and range of equivalency of the claims are therefore intended to be embraced therein. While the preferred embodiments of the present invention have been described using specific terms, such description is for illustrative purposes only, and it is to be understood that changes and variations may be made without departing from the spirit or scope of the appended claims.

What is claimed is:

1. A structure comprising:
a substrate; and
a light modulating film formed on top of the substrate, wherein:
the light modulating film is made of polycrystalline PLZT containing Pb, Zr, Ti, and La as constituent elements;
a La concentration in the film falls within a range of 5 at % to 30 at %; and
grains constituting the polycrystalline PLZT have an average grain size of 800 nm or greater.

2. The structure according to claim 1, wherein a peak half width of X-ray diffraction on a (111) plane is smaller than or equal to 5°.

3. The structure according to claim 1, wherein:
the substrate includes a silicon substrate and an insulating film formed on the silicon substrate; and
the light modulating film is formed on the insulating film.

4. The structure according to claim 3, wherein:
a reflecting film is formed on the insulating film; and
the light modulating film is formed on the reflecting film.

5. The structure according to claim 1, wherein the light modulating film is formed by a sol-gel method.

6. A light control device comprising:
the structure according to claim 1; and
a pair of electrodes formed on the light modulating film, wherein
the light modulating film varies in refractive index in accordance with an electric field applied between the pair of electrodes.

7. A structure comprising:
a substrate; and
a light modulating film formed on top of the substrate, wherein:
the light modulating film is made of polycrystalline PLZT containing Pb, Zr, Ti, and La as constituent elements;
a La concentration in the film falls within a range of 5 at % to 30 at %; and a value of I(111)/I(110) is higher than or equal to 1, where I(110) is X-ray diffraction intensity on the (110) plane of the polycrystalline PLZT, and I(111) is X-ray diffraction intensity on the (111) plane.

8. The structure according to claim 7, wherein a peak half width of the X-ray diffraction on the (111) plane is smaller than or equal to 5°.

9. The structure according to claim 7, wherein:
the substrate includes a silicon substrate and an insulating film formed on the silicon substrate; and
the light modulating film is formed on the insulating film.

10. The structure according to claim 9, wherein:
a reflecting film is formed on the insulating film; and
the light modulating film is formed on the reflecting film.

11. The structure according to claim 7, wherein the light modulating film is formed by a sol-gel method.

12. A light control device comprising:
the structure according to claim 7; and
a pair of electrodes formed on the light modulating film, wherein
the light modulating film varies in refractive index in accordance with an electric field applied between the pair of electrodes.

* * * * *